Patented Feb. 10, 1931

1,792,200

UNITED STATES PATENT OFFICE

JORGEN ERNST THOMSEN, OF JERSEY CITY, NEW JERSEY

DENTAL CEMENT AND PROCESS OF MAKING THE SAME

No Drawing.   Application filed September 20, 1928.  Serial No. 307,345.

This application is a continuation in part of my co-pending application Serial No. 123,012, filed in the United States Patent Office on or about July 16, 1926, and entitled "Improvements in dental cements and processes of making the same".

This invention relates to a new dental cement and the process of making the same. There are two types of cement generally employed in dental work—one is the so-called zinc oxide cement and the other is the so-called silicate cement.

Zinc oxide cements are prepared by admixing zinc oxide with bismuth oxide, magnesium oxide, etc. The silicate cements consist of alumina, lime, silica and fluorine, etc. Fluorine may or may not be present and is not essential.

In the process of manufacture of zinc oxide cement it is brought to a high temperature, but not sufficient to fuse the same. It is merely concentrated. The product is then ground and passed through fine sieves, cloth, etc. In the process of making the silicate cements, the cement is brought to complete fusion and is then poured into molds in manner similar to glass. The resulting product is pulverized, sieved, molded, etc.

In order to produce a plastic mass from these which can be worked and which will harden, it is necessary to mix the powder containing basic elements with the proper proportion of phosphoric acid. It is unnecessary to go into the various methods of preparing the phosphoric acid as a binder for these cements, except to state that the acids are mixed with certain modifiers, zinc carbonate as an example, and heated to a low temperature to drive off the carbon dioxide. It is then diluted with water to regulate the setting time.

A great amount of difficulty is experienced in the use of dental cements, in the proper proportioning of the phosphoric acid. Ordinarily the mixture of basic elements comes on the market in the form of a powder. When the cement is to be used the dentist will take a suitable amount of the powder and then add sufficient phosphoric acid thereto to combine with the basic elements of the cement. If more phosphoric than the equivalent amount is added, there will be an excess of phosphoric acid which will have a detrimental effect upon the tooth structure. If too little phosphoric acid is added, the resulting mass will tend to readily crumble and break down. The phosphoric acid, when admixed with the basic powder, will form a plastic mass which upon standing will harden. This hardened mass will have satisfactory properties only if such amount of phosphoric acid is used as is required to combine with the basic constituents present.

Usually an excess of phosphoric acid is used. The free acid remaining irritates the pulps of the teeth, causing pain, shock to the pulp and often loss of the pulp.

The object of this invention is to eliminate this difficulty by accurately proportioning the amount of acid required to combine thoroughly with a given cement by incorporating the required acid with the dry powder in the process of manufacture of the cement, and preparing same for sale in such a manner so that all that is required of the user is to mix water with the powder, apply this mixture to the tooth cavity, and the cement will set in exactly the same manner as if ordinary cement powder had been used with phosphoric acid, as a result of which irritation and pain or harm to the tooth pulp are avoided to a great extent or entirely. The phosphoric acid in the present invention is mixed at the manufacturing plant and is allowed to partially combine with the basic elements, and this is preferably done without the external application of heat.

The strength of the phosphoric acid used may be varied within certain limits, and such limits, as well as the preferred strengths, will sometimes be affected by existing conditions and will vary therewith. For example, acids comprising less than $2H_2O$ to $1P_2O_5$ generally cannot be used advantageously with silicate cements nor with some zinc oxide cements, while they may be very effective for my purpose with other zinc oxide cements where the lower limit of $H_2O$ is $1\frac{1}{2}H_2O$ to $1P_2O_5$. Again, the temperature of calcination of the zinc oxide in the preparation thereof frequently affects the strength of the phosphoric acid which is to be preferred, as well as the range of strengths which may be used to advantage. Furthermore copper chloride or iodide, or silver salts, are sometimes added to the cements as a germicide, and such additions may affect the strengths of the phosphoric acid which is to be preferred, and it may even have an effect on the range of useful strengths. Other conditions may have a like effect. It is therefore impossible to state exactly for all cements the best strength of the phosphoric acid to be used therewith or the limits within which it may be varied.

I can state, however, as a general rule that the ratio of $H_2O$ to $P_2O_5$ should not be less than $2H_2O$ to $1P_2O_5$ in the case of phosphoric acid used with silicate cements, and $1\frac{1}{2}H_2O$ to $1P_2O_5$ for acid used with zinc oxide cements; although as already stated this ratio should not be less than 2 to 1 even for some zinc oxide cements. Less than $1\frac{1}{2}H_2O$ to $1P_2O_5$ is usually ineffective for dental cements, but this low limit of $H_2O$ in the acid is under certain conditions sometimes outside of the advantageous limits. As stated above, various conditions will cause variations in the strengths of the phosphoric acid which it is best to use, as well as of the limits of strengths which may be used. I generally prefer to use acid of a strength of $3H_2O$ to $1P_2O_5$, that is orthophosphoric acid, $H_3PO_4$. The composition of ordinary phosphoric acid of commerce is usually $P_2O_5$—$4H_2O$ and it is necessary to add metaphosphoric acid ($P_2O_5$—$H_2O$) to bring the $H_2O$ and $P_2O_5$ into the proper proportions. Although the proportion $P_2O_5$—$3H_2O$ is preferred, it may vary between, say, $P_2O_5$—$3\frac{1}{2}H_2O$ and $P_2O_5$—$2H_2O$, or even $P_2O_5$—$1\frac{1}{2}H_2O$ as above stated. Too much water is to be avoided, since it would cause premature hardening of the cement.

The following are examples of some silicate cements:

|  | I | II |
|---|---|---|
| $Na_2SiF_6$ | 142 | 142 |
| $CaF_2$ | 20 | 20 |
| $Al_2O_3 \cdot xH_2O$ | 158 | 158 |
| $SiO_2$ | 102 | 114 |

Beryllium silicate and cryolite could be used instead of or together with some of the above constituents, and aluminum phosphate may also be used.

A suitable admixture of phosphoric acid and a cement similar to the end above set forth would be 50 parts of phosphoric acid to 145 parts of the cement, although the parts of the cement could be readily varied between 140 and 150 parts. The variation might also be anywhere between 130 to 165 parts of the cement to 50 parts of phosphoric acid.

Zinc oxide cements, for example, cements comprising 90 parts of zinc oxide and 10 parts of magnesium oxide or corresponding quantities of magnesium carbonate or/and silicofluoride would require relatively more phosphoric acid, due to greater basicity. A suitable mixture could be formed from 150 parts of zinc oxide cement and 110 parts of phosphoric acid, but the amount of phosphoric acid may be varied between 100 and 150 parts.

The powder and the phosphoric acid are mixed together at room temperature, the reaction between them generating sufficient heat, under ordinary working conditions to heat the mass to about between about 100° and 180° F. or about 30° to 70° C., which is sufficient to cause removal of the excess water present; and allowing the mass to stand until cool will generally result in a dry mass which is then to be comminuted or powdered.

Apparently the phosphoric acid is present therein in some combined form and this seems to become cementitiously active on the addition of water. While this seems to be the case, yet I do not intend to restrict my invention to any theory; but aside from any theory, the dry powder when mixed with water as above described becomes cementitious and sets.

The resulting powder is packaged for sale. It is ready for use and it is necessary only to add the desired amount of water to produce a desirable plastic mass ready for use and which upon standing will readily harden. The thinner it is desired to make this cement, for example cementing for crown and bridge work to teeth, the more water will be added. Less water will be added when a thick plastic mass is desired, as for filling teeth.

The specific proportions given above are merely illustrative and this invention is of broad application to all dental cements of the character above described. The composition both in respect to constituents and proportions may be widely varied.

Having described my invention, what I now claim is:

1. The herein-described composition of matter in dry powder form suitable for use as a dental cement by the addition thereto of water alone, said composition consisting of approximately 145 parts by weight of a silicate cement and from 40 to 60 parts by weight of pure orthophosphoric acid or the equivalent of said acid in $P_2O_5$ radical, said ingredients being mixed together at a temperature sufficiently low to retain the mixture in an unstable condition capable of subsequently reacting with the added water to form a plastic mass capable of hardening.

2. The herein-described composition of matter in dry powder form suitable for use as a dental cement by the addition thereto of water alone, said composition consisting of approximately 150 parts by weight of a basic metal-oxide cement and from 100 to 150 parts by weight of a phosphoric acid containing the $P_2O_5$ radical in combination with from 1½ to 2 molecules of combined water, said ingredients being mixed together at a temperature sufficiently low to retain the mixture in an unstable condition capable of subsequently reacting with the added water to form a plastic mass capable of hardening.

JORGEN ERNST THOMSEN.